March 10, 1964 J. O. SCHROEDER 3,124,653

RADIO SIGNAL RECEIVERS

Filed July 2, 1962 2 Sheets-Sheet 1

INVENTOR.
JOHN O. SCHROEDER
BY Eugene M. Whitacre
ATTORNEY

INVENTOR
JOHN O. SCHROEDER
BY Eugene M. Whitacre
ATTORNEY

United States Patent Office 3,124,653

Patented Mar. 10, 1964

3,124,653

RADIO SIGNAL RECEIVERS

John O. Schroeder, Trenton, N.J., assignor to Radio Corporation of America, a corporation of Delaware Filed July 2, 1962, Ser. No. 206,765
9 Claims. (Cl. 179—15)

The present invention relates to stereophonic multiplex radio signal receivers, and more particularly to compatible stereophonic multiplex frequency-modulation radio receivers which operate in response to both monophonic and stereophonic signal information on a single modulated carrier wave.

In such receivers, under the presently accepted method of broadcasting, the carrier wave is frequency-modulated by the sum of two modulating audio-frequency signals, such as two stereophonically-related left (L) and right (R) signals, as a single modulating signal in the usual manner for FM broadcast and compatible reception by existing monophonic receivers. However, in the multiplex system, the carrier wave further is simultaneously provided with stereophonic information effective for signal separation, in the form of a modulating suppressed carrier subcarrier signal which is amplitude-modulated with the difference of the two stereophonically related signals to be transmitted, and a pilot signal for use in demodulating the suppressed carrier signal.

The compatible composite stereophonic signal at the multiplex output circuit or terminal of the frequency-modulation detector of the multiplex receiver may thus be composed of the main frequency-modulation signal component, which is the compatible signal used by an unmodified monophonic frequency-modulation receiver, a 19 kc. (kilocycles per second) pilot signal, and the difference-frequency, $(L-R)$ signal, which is an AM double-sideband suppressed-carrier signal at 38 kc., the second harmonic of the pilot subcarrier. The sum and difference matrixing in conjunction with the AM suppressed-carrier subchannel permits a maximum of 90% modulation of the main carrier either by the sum $(L+R)$ modulation audio frequency signal itself, or the difference $(L-R)$ modulation-signal suppressed-carrier subchannel signal. The phase and frequency response of both the "sum" and "difference" signal channels are substantially the same over an audio-frequency range of 50–15,000 cycles (cycles per second) for example, and good channel separation can be attained.

In addition it is contemplated, in accordance with the present method of broadcasting, to provide SCA (subsidiary communications authorization) background music or program material in a second subcarrier signal channel, that may be on a subcarrier frequency of 67 kc. and that can modulate the main carrier up to 10% with sidebands of approximately 8 kc. on each side, in an upper band between 59 kc. and 75 kc.

There are many existing frequency-modulation receivers in use that can be or are arranged for adaptation to stereophonic signal translation and reproduction by the provision of multiplex signal output connection means at the frequency-modulation detector and preceding the de-emphasis circuit. A stereophonic multiplex unit for separating and deriving the two stereophonically-related signals from a compatible stereophonic signal is thus desirable and can be made integral with new receivers or applied as an adaptor unit to existing receivers.

In existing systems, the compatible composite stereophonic signal at the multiplex output circuit or terminal of the frequency-modulation detector, as hereinbefore referred to, is applied to the stereo multiplex unit which operates to separate the subcarrier or stereophonic information with a suitable highpass or bandpass filter means which provide a substantially flat frequency response from 23 kc. to 53 kc., after which the difference $(L-R)$ component is demodulated. By suitable matrix circuitry which follows, the demodulated subcarrier signal $(L-R)$ is subtracted from, and added to the sum signal $(L+R)$ component to obtain separate stereophonically-related (L) or (R) signals which are then de-emphasized before being fed to two separate stereophonic signal output channels.

One problem which has been encountered in prior stereophonic FM multiplex units of the type described is that of excessive intermodulation distortion. This distortion results in large part from interaction between the 19 kc. pilot signal with signals whose frequencies are nearly subharmonic thereto. For example $(L+R)$ signals at 12⅔ kc. or 6⅓ kc., or detected subcarrier sidebands $(L-R)$ signals at these frequencies react with the 19 kc. pilot signal wave to produce the undesired intermodulation distortion.

The intermodulation of pilot signal and reinserted stereophonic subcarrier with their subharmonics occurs in the non-linear detection mechanism of an FM stereo demodulator. The audio-frequency beat caused by this intermodulation is particularly objectionable since it is usually not harmonically related to the information involved in its generation and is distinguishable from "natural" intermodulation effects resulting from the actual program material, the acoustics of the hall and of the listening room, etc. Since the 19 kc. signal is present in the detection process at a nearly constant level, the intermodulation may be sustained for noticeable periods on some program material, robbing it of brilliance.

The filters used in prior stereophonic demodulators for separating the subcarrier sidebands attempted to approximate a flat frequency bandpass from 23 kc. to 53 kc. to separate the subcarrier sidebands from the rest of the composite signal, however the cut-off characteristic for these filters for frequencies outside the desired passband is poor unless the filter is made complicated and expensive. Accordingly the 19 kc. and $(L+R)$ components which produce intermodulation distortion are fed to the subcarrier detector, and in addition the subcarrier sidebands which when detected produce signals at nearly the undesired subharmonic frequency arrive full strength at the subcarrier detector.

It is an object of this invention to provide an improved stereophonic multiplex unit for frequency modulation radio receivers.

It is a further object of this invention to provide an improved stereophonic multiplex unit for frequency modulation radio receivers in which the amount of the 19 kc. pilot signal fed to the subcarrier detector is substantially reduced.

In accordance with the invention an amplifying device having a pair of output electrodes has a tuned output circuit connected between one of the ouput electrodes and a point of reference potential. A second aperiodic output circuit for developing the composite stereophonic signal, and undesirably a portion of the pilot signal as connected between the other output electrode and the point of reference potential. To provide a composite signal which is substantially free of the pilot signal, a pair of impedance elements are connected in series between the output electrodes. The impedance values of the impedance elements are related to the pilot signal voltages in the first and second output circuits so that a composite stereophonic signal substantially free of the 19 kc. pilot signal may be derived at the junction of the serially connected impedance elements. The subcarrier sidebands may then be separated by a suitable filter and fed to a subcarrier detector together with a demodulating signal derived from the 19 kc. pilot signal.

The novel features which are considered to be characteristic of this invention are set forth with particularity in the appended claims. The invention, itself, however both as to its organization and method of operation will best be understood from the following description in which:

Figure 1:
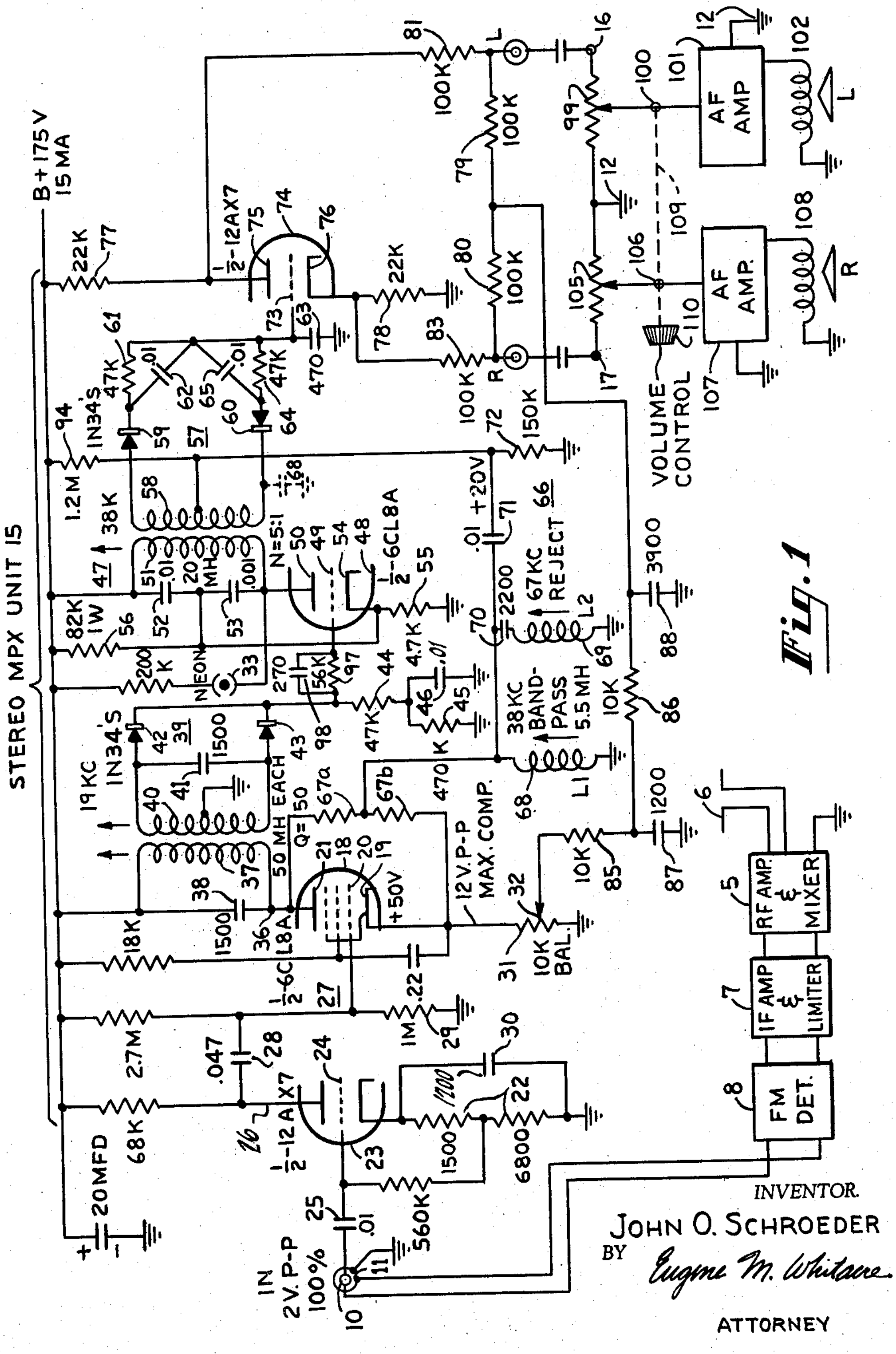
FIGURE 1 is a schematic circuit diagram of a multiplex demodulator and matrixing unit embodying the invention, and shown in connection with an FM receiver and audio amplifier shown in block form.
Figure 3:
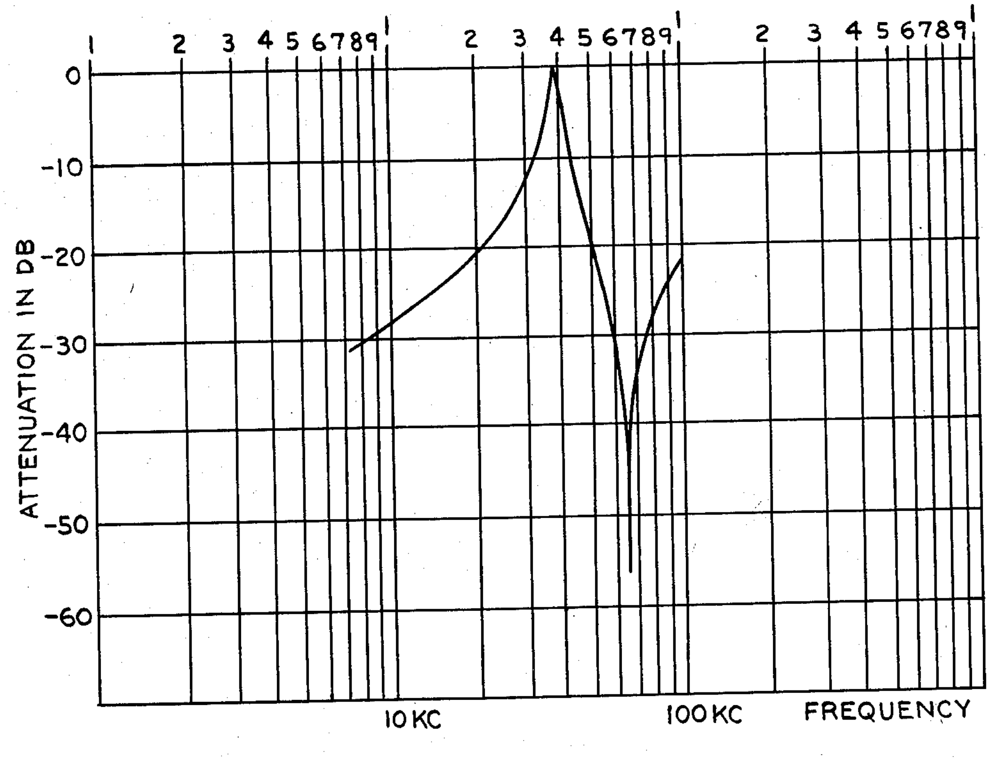
Figure 4A:
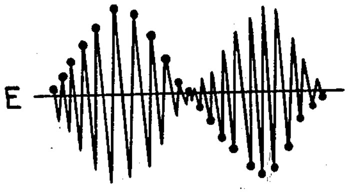
Figure 4B:
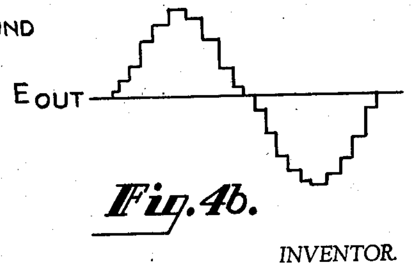

FIGURE 3 is a graph showing the frequency response characteristic of the subcarrier sideband separating filter and de-emphasis network used in the stereophonic multiplex unit of FIGURE 1; and FIGURES 4*a* and 4*b* are graphs showing the stereophonic sideband information for a cycle of a modulating signal, and the demodulated wave resulting therefrom after detection by the subcarrier detector shown in FIGURE 1.

Referring to the drawings and more particularly to FIGURE 1, the part of the receiver circuit shown in block form is representative of certain components of any frequency modulation receiver which may be adapted for stereophonic multiplex operation. In this respect it is provided with the usual R-F amplifier and mixer 5 tunable through the frequency-modulation band of 88 to 108 mc., and coupled to antenna means 6 and the usual I-F amplifier and limiter 7 which is followed by a suitable FM detector 8. The FM detector 8 includes a pair of output terminals 10 and 11 across which are developed the main channel or $(L+R)$ signals, the subcarrier sidebands representative of the $(L-R)$ signal and the 19 kc. pilot tone.

Connected with the multiplex output circuit or terminals 10—11 of the FM detector 8 is a stereophonic multiplex unit 15 for deriving two stereophonically-related (L and R) or like modulation signals from the composite signal at the FM detector output terminals. This unit may be added to existing receivers or may be built integrally therewith during manufacture, and provides, at two stereo or channel output terminals 16 and 17, the separated modulation component signals such as the L and R stereo signals in the present example.

In the stereo multiplex unit 15, a signal amplifier stage is provided in connection with an amplifier tube 18 having a cathode 19, a control grid 20 and an output anode 21. In the present example this may be the pentode portion of a pentode-triode tube for economy of construction. This stage may be coupled directly with the FM detector 8 output terminals 10—11, but in the present example is preferably coupled therewith through an intermediate signal amplifier stage comprising a triode amplifier tube 23 which may be the other half of the pentode-triode. The triode tube 23 has an input grid circuit 24 coupled to the terminal 10 through a coupling capacitor 25, and a cathode circuit including a resistor network 22 which is partially bypassed by a capacitor 30 to boost the high frequency response of the stage. An output plate circuit 26 for the tube 23 is coupled to the input grid 20 of the tube 18 through a grid circuit 27 including a coupling capacitor 28 and a grid resistor 29 connected between the grid 20 and ground. The cathode circuit of the tube 18 includes a resistor 31 having a movable tap 32. The plate or anode circuit 36 of the amplifier tube 18 is tuned to the pilot signal, which is 19 kc. in the present example, by a tunable winding 37 and shunt tuning capacitor 38.

Frequency doubling of the 19 kc. pilot signal is accomplished by a full wave rectifier circuit 39. The full wave rectifier 39 includes a grounded center tapped winding 40 which is coupled to the winding 37, and is tuned to the pilot signal frequency by a capacitor 41. In addition, the full wave rectifier frequency doubler includes a pair of diodes, which are shown as semiconductor diodes, 42 and 43, the cathodes of which are connected together and the anodes of which are connected respectively to opposite ends of the winding 40. The direct current paths for the diodes 42 and 43 is completed through a pair of series connected resistors 44 and 45 to ground and the center tap of the winding 40. A capacitor 46 is connected in parallel with the resistor 45.

A modified Colpitts oscillator circuit 47 which is inoperative in the absence of the pilot signal includes a triode tube 48 which may comprise a portion of a dual-triode tube. The tube 48 includes a control grid 49 which is coupled through a parallel resistor 97, capacitor 98 network to the junction between the diodes 42 and 43 and the resistor 44 to receive a turn-on voltage and a phase locking signal when a 19 kc. pilot signal is received. The anode 50 of the triode 48 is connected to a source of energizing potential +B, through a parallel resonant tank circuit tuned to 38 kc., which is twice the frequency of the pilot signal. The parallel resonant circuit includes a tunable inductor 51 across which a pair of series capacitors 52 and 53 is connected. The junction of the capacitors 52 and 53 is connected to the cathode 54 to sustain oscillation when the tube 48 is properly biased. During monophonic reception, the tube 48 is cut-off because the cathode 54 is connected to the junction of a pair of resistors 55 and 56, which are serially connected between the operating potential supply terminal +B and ground to receive a cut off bias. When a pilot signal is received, the direct voltage appearing across the resistors 44 and 45 permits the oscillator circuit to commence oscillation locked in frequency and phase to the 38 kc. ripple component produced by the full wave rectification of the pilot signal. Although the oscillator shown in FIGURE 1 is connected to operate with its grid bias at reference potential, the oscillator configurations can be used without departing from the scope of the invention.

A stereophonic reception indicator circuit comprising a neon tube 33, and a resistor 34 is connected between the oscillator tube anode and the +B terminal. The neon tube lights up only when the circuit 47 is oscillating, that is, only during stereophonic signal reception.

A switching voltage at 38 kc. from the oscillator circuit 47 is coupled to a balanced synchronous peak detector circuit 57 which is operative to derive the $(L-R)$ signal components from the subcarrier signal sidebands. The detector circuit 57 includes a center tapped winding 58 which is coupled to the oscillator tank circuit inductor 51, and a pair of diodes 59 and 60. The anode of the diode 59 is connected to one end of the winding 58, and the cathode thereof is coupled through a parallel resistor 61, capacitor 62 network to ground by way of a capacitor 63. The cathode of the diode 60 is connected to the opposite end of the winding 58, and the anode thereof is coupled through a parallel resistor 64, capacitor 65 network to the capacitor 63 and hence to ground.

The subcarrier sidebands containing the $(L-R)$ signal information are inserted into the detector circuit 57 at the center tap of the winding 58. To this end it should be noted that the composite demodulated FM signal including the $(L+R)$ signal, the 19 kc. pilot signal and the subcarrier wave sidebands appear at the cathode 19 terminal of the amplifier 18.

Substantially only the 19 kc. pilot signal appears at the anode 21 terminal at the amplifier because the tuned circuit 37 and 38 is sharply tuned to the pilot signal frequency as mentioned above the application of the 19 kc. pilot signal to the nonlinear subcarrier detector tends to produce undesirable cross-talk products. Hence it is desirable that the signals fed to the subcarrier detector be substantially free of the pilot signal component.

To this end, a pair of resistors 67*a* and 67*b* are serially connected between the anode 21 and cathode 19. The resistors 67*a* and 67*b* together with the resonant circuit 37—38 and the resistor 31 form a bridge circuit. The relative values of the resistors 67a and 67b are selected so that substantially no pilot signal voltage appears at their junction. This may be effected by selecting the ratio of the resistor 67a to the resistor 67b to be the same as the ratio of the pilot signal voltage appearing at the anode 21 to the pilot signal voltage appearing at the cathode 19.

The composite stereophonic signal less the pilot signal which appears at the junction of the resistors 67a and 67b is fed to a combined filter and deemphasis network 66 which selects the subcarrier wave sidebands and provides predetection deemphasis thereof. In addition to the input resistance provided by the resistors 67a and 67b, the filter end de-emphasis network 66 includes a shunt inductor 68, and a trap circuit comprising an inductor 69 and capacitor 70 which are series resonant at 67 kc., the frequency of an (SCA) channel which may also be transmitted on the same carrier. The inductor 68 resonates with the effective capaictance thereacross at a frequency of 38 kc., the center frequency of the subcarrier channel, and attenuates signals on either side of 38 kc. The overall characteristic of the network is such that the high frequencies of the resultant demodulated signals are attenuated at approximately a rate of 75 microseconds to provide high frequency de-emphasis. As is known, such de-emphasis is necessary to compensate for the high frequency pre-emphasis added at the transmitter to improve the overall signal to noise ratio of the FM transmission and receiving system.

A blocking capacitor 71 couples the signal output from the filter 66 to a resistor 72 connected between the center tap of the winding 58 to ground, and a resistor 94 extending from the center tap to +B establishes the bias level for a phase splitter tube 74.

Demodulated subcarrier sideband signals $(L-R)$ are developed across the capacitor 63 and applied to the control grid 73 of a triode tube 74 which is connected as a phase splitter. The tube 74 includes an anode 75 and cathode 76 which are connected respectively, through load impedance elements 77, 78 to the operating potential supply source +B, and to ground.

A matrix network including a pair of series connected resistors 79 and 80 are coupled to receive opposite phases of the $(L-R)$ signal from the phase splitter stage 74. One end of the resistor 79 is coupled to the anode 75 through an isolating resistor 81 to receive the $+(L-R)$ signal, and one end of the resistor 80 is coupled to the cathode 76 through an isolating resistor 83 to receive the $-(L-R)$ signal.

The $(L+R)$ signal, derived from the cathode 19 of the amplifier 18, is applied between the junction of the resistors 79 and 80 and ground. The pilot signal and subcarrier sidebands as well as other high frequency components which may be present at the cathode 19 are effectively removed by the high frequency de-emphasis circuit comprising the series resistor 85 and 86 and the shunt capacitors 87 and 88. The time constant of this de-emphasis network, taking into account the loading of resistors 79 and 80 is approximately 75 microseconds. The $(L+R)$ signal adds to the $+(L-R)$ and $-(L-R)$ signals respectively, to produce the left and right stereophonic signals at the terminals 16 and 17 respectively. Adjustment of the tap 32 on the variable resistor 31 provides the proper amount of $(L+R)$ signal to the matrix circuit so that the addition and subtraction of the $(L+R)$ and $(L-R)$ signals produces the proper signal output at the terminals 16 and 17.

The radio receiver signal translating system includes suitable means connected with the terminals 16 and 17 of the stereo multiplex unit to amplify and reproduce the two channel signals, which are here assumed to be the left and right, or L and R, audio-frequency signals which are stereophonically-related. To this end, the terminal 16 is connected to system ground 12 through an output volume-control potentiometer resistor 99 having an output volume control contact 100 connected with a suitable audio frequency channel amplifier 101, as indicated, which has a common ground return connection 12 and is connected to drive a left-channel output loudspeaker 102.

Likewise the output terminal 17 is connected to system ground 12 through a second channel volume-control potentiometer resistor 105 having an output volume control contact 106 connected to the second channel amplifier means 107, having a common ground return connection 12 and a right channel output loudspeaker 108 connected therewith as shown. As is customary, the volume-control means are gang-connected for joint operation as indicated by the dotted line connection 109 and the common volume control knob represented at 110 in connection therewith. This dual-channel signal translating circuit and sound-reproducing output means therefor is representative of any suitable means of this type normally provided in a stereophonic sound reproducing system.

Figure 2:
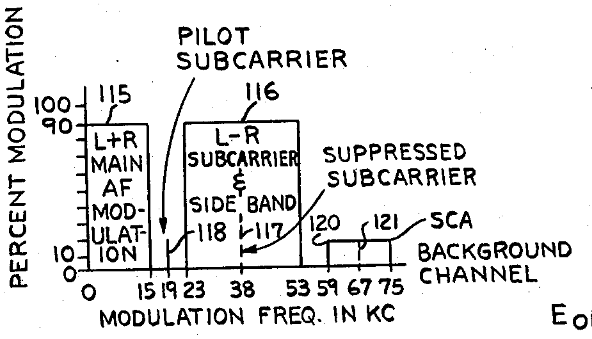
FIGURE 2 is a graph indicating the range of frequency spectrum and modulation components of a composite modulation signal as applied to the stereophonic multiplex unit of the circuit of FIGURE 1, with reference to certain operating features of the invention.

Referring now to FIGURE 2 along with FIGURE 1, the operation of the multiplex unit in the receiver may now be considered. The composite signal at the multiplex output terminals 10—11 of the FM detector 8 when the receiver is responding to compatible stereophonic signals, may be represented by the graph of FIGURE 2 drawn with reference to the FM carrier modulation frequency in kilocycles along the X axis and percentage modulation along the Y axis which also indicates relative amplitudes of subcarrier signals. It will be seen that the total signal is composed of an $(L+R)$ component 115 which may provide as much as 90% modulation and an $(L-R)$ double-sideband suppressed-carrier AM signal component 116 which may also modulate the carrier up to 90% as indicated, but 180° out of phase with the modulation provided by the main modulation component 115. In other words when the component 115 is maximum the component 116 is minimum.

In the graph of FIGURE 2, it is assumed that the audio-frequency modulation will extend from zero to 15 kc. As a practical matter it is known that the modulation frequency actually may extend between 50 cycles and slightly less than 15 kc., depending upon the fidelity of the studio equipment used for modulating the system. The restored suppressed-carrier signal indicated by the dotted line 117 is at 38 kc. and is the second harmonic of the pilot carrier represented at 118 with a frequency of 19 kc. The sidebands of the suppressed subcarrier extend substantially from 23 kc. to 53 kc. as indicated, thereby to provide for substantially the full 15 kc. modulation referred to.

The possible SCA background music channel is indicated by the block 120 and extends 7.5 kc. on either side of a 67 kc. subcarrier signal indicated by the dotted line 121.

When a stereophonic FM signal is being received by the FM receiver, a composite signal as represented in FIGURE 2 is developed across the output terminals of the FM detector 8. Since the response of the stages preceeding the stero multiplex unit 15 may "roll-off" at high frequencies, that is, provide less gain at high frequencies, the overall receiver frequency response may be made flat by designing the amplifier stage 23 to provide more gain at the higher frequencies. This is done in the present example by selecting the resistance value of the network 22 and the capacitance of the capacitor 30 to provide low frequency degeneration or high frequency boost in proportion to the amount of high frequency roll-off in the preceeding stages.

The resultant signal is linearly amplified in the stage 18, with the 19 kc. pilot signal being developed in the tuned anode 36 circuit, and the composite signal in the cathode 19 circuit.

The full wave rectifier-frequency doubling circuit 39 receives the 19 kc. pilot signal energy from the tuned anode 36 circuit. On the half cycle where the top terminal of the winding 40 is positive, the diode 43 is cut-off and the diode 42 conducts current which flows through the resistors 44 and 45 back to the center tap of the winding 40. On opposite half cycles the diode 42 is cut-off and the diode 43 conducts through the same path. Since resistor 44 is small relative to the resistor 45, the capacitor 46 charges up to positive voltage almost equal to the peak voltage of the signals across each half of the winding 40. Since the resistor 44 is not bypassed by the capacitor 46, a pronounced voltage pulse is produced thereacross at a 38 kc. rate, or two pulses for each cycle of the 19 kc. pilot tone. This discharge time constant for the resistor 45, capacitor 46 network is adjusted to control the conduction angle of the diodes 42, 43. In practice, excellent operational characteristics were observed when each diode conducted for about 30° per cycle of 19 kc. pilot signal energy.

During monophonic reception, the oscillator does not operate because of the positive voltage applied to the cathode thereof, and noise at 19 kc. does not tend to turn the oscillator on because of the time-constant of the resistor 44, capacitor 46 network. When the positive voltage from the full wave rectifier frequency doubler circuit 39 exceeds at grid 49 the threshold voltage at the cathode 54 set by the voltage divider 55—56, the circuit oscillates and is locked in frequency and phase to the 38 kc. pulses applied to the grid 49. It will be noted that the capacitor 98 provides a low impedance path for the 38 kc. synchronizing pulses, and the resistor 97 provides isolation between the negative voltage which tends to build up at the grid when the oscillator begins oscillating, and the positive voltage which develops across the resistors 44 and 45.

The 38 kc. voltage appearing at the anode 50 is applied to a neon lamp 33, which lights up to provide an indication that stereophonic signals are being received.

The fact that the oscillator output voltage is necessary for the detection of the subcarrier sidebands, and this output voltage is produced only when a stereophonic signal is received, provides an automatic stereophonic-monophonic control for the receiver.

The 38 kc. oscillator output voltage and the subcarrier sidebands are applied to the balanced synchronous switch detector 57 to derive the original $L-R$ signal information. One of the problems encountered in previous FM multiplex subcarrier detectors for stereophonic signal transmission is that of severe intermodulation distortion. It has been found that one of the primary causes of this distortion is the intermodulation between the pilot signal (19 kc.) with signal information which is nearly subharmonic to the 38 kc. subcarrier frequency. For example $(L+R)$ signals at nearly 9.5, 6⅓ kc., 12⅔ or detected $(L-R)$ signals at these frequencies react with the 19 kc. pilot signal in the subcarrier detector to produce the undesired intermodulation distortion.

The intermodulation of pilot signal residue with its subharmonics can occur in the nonlinear detection mechanism of an FM stereo demodulator. The audio-frequency beat caused by this intermodulation is particularly objectionable since it is usually not harmonically related to the information involved in its generation and is thus distinguishable from "natural" intermodulation effects resulting from the non-linear translation of the actual program material. The presence of the 19 kc. signal in the detection process at a nearly constant level is assured; so that unrelated notes resulting from intermodulation distortion can be sustained for noticeable periods on some program material, thereby producing objectional effects in the sound output.

The cross modulation problem is considerably reduced by substantially eliminating the 19 kc. pilot signal from the signals applied to the subcarrier detector. The balancing network including the resistors 67*a* and 67*b* connected the anode 21 and cathode 19 at which points the pilot signal voltage is 180° out of phase. As mentioned above the relative values of the resistors 67*a* and 67*b* are selected so that the pilot signal is balanced out at the junction thereof.

If desired the cross modulation can be further reduced by the use of predetection de-emphasis. In the present case the de-emphasis is effected in connection with the filter circuit 66 which separates the subcarrier sidebands from the remainder of the signal. The inductor 68 of the filter 66 resonates with the effective capacity of the circuit 69—70 at 38 kc. The series inductor 69-capacitor 70 resonate at 67 kc. to provide better SCA channel rejection than could be obtained with a simple parallel resonant circuit. In addition, the series resonant circuit tends to make the overall filter 66 response symmetrical on an arithmetic scale rather than a logarithmic scale which is the case with a simple parallel resonant circuit. The filter 66, in combination with the resistance of the input network including the resistors 67*a* and 67*b* attenuates the subcarrier sidebands in such a manner that the resulting $(L-R)$ audio frequency signal high frequency information is de-emphasized at a rate of 75 microseconds. The response of this network is shown in FIGURE 3. The exact proportions of the elements depend upon how much the preceeding stages have attenuated the high frequency signal components that is, on how much high frequency roll-off occurs in the preceeding tuner. In the present case the tuner roll-off is compensated by a complementary amount of high frequency gain in the amplifier stage 23.

It can be seen from the graph of FIGURE 3 that the filter-de-emphasis network attenuates the 67 kc. SCA subcarrier signal 57 db., the 19 kc. pilot signal 21 db., and the main channel audio components in excess of 25 db. Since the 19 kc. pilot signal and the subharmonic components thereof in the $L+R$ channel are greatly attenuated, the amount of intermodulation between these components is also attenuated. In like manner, the subcarrier sideband frequencies which when detected produce audio frequencies subharmonically related to the pilot signal are attenuated to also reduce the intermodulation distortion. In this regard it should be noted that the intermodulation ouput is a product function of the intermodulating signals.

The predetection de-emphasis provides another advantage in that any intermodulation distortion which is produced in the subcarrier detector is not emphasized. To illustrate, in prior multiplex units audio signals at about 6 kc. could interact with the 19 kc. pilot signal to produce about a 1 kc. intermodulation product. (The third harmonic of 6 kc. intermodulating with 19 kc.) Following detection, the signal was passed through a de-emphasis network where the 6 kc. signal from which the intermodulation produce originated is attenuated relative to the resultant 1 kc. signal. This process has the effect of emphasizing the intermodulation product relative to the rest of the signal.

However, where predetection de-emphasis is used, any intermodulation output from the detector is not emphasized in the manner described above, thereby providing an effective reduction in such distortion so far as the listener is concerned.

Another feature which tends to reduce the amount of intermodulation distortion in the circuit of FIGURE 1 is the use of the full wave-rectifier frequency doubler connected in a balanced circuit configuration. With the balanced circuit, the 19 kc. pilot tone is not fed to the oscillator along with the 38 kc. component. As a result, the danger of the 19 kc. pilot signal reaching the subcarrier detector through the oscillator channel is materially reduced.

Since the de-emphasis process is effected prior to detection rather than subsequent thereto in the multiplex unit 15, it is desirable to use a detector which does not have high frequency components corresponding to the pilot signal, subcarrier, subcarrier sidebands or the like in its output. The reason for this is that the high frequency energy may cause distortion in succeeding amplifier stages by driving these amplifiers sufficiently away from the center of the linear portion of their dynamic range, that the desired audio signals drive these amplifiers into nonlinear regions. In addition, the undesired high frequency energy may cause other undesirable effects such as heating of the loudspeaker voice coils.

The balanced synchronous peak detector 57 provides a high ratio of desired audio to spurious frequency output with no additional filtering requirements. To understand the operation of the detector 57 ignore for the moment the subcarrier sideband connections and assume that the center tap of the winding 58 is grounded, and that only the 38 kc. oscillator voltage is applied to the diodes 59 and 60. Assuming no diode losses, the cathode voltage of diode 59 will after several cycles of input voltage, reach a positive D.-C. lever which corresponds to the peak value of the applied oscillator voltage since the time constant of the resistor 61-capacitor 62 is long compared to the period of the 38 kc. input source. Under these conditions, the diode 59 current flows for a very few degrees of each cycle, or in other words the diode represents an open circuit except for the brief time of conduction. The conduction angle can be controlled by selection of the amplitude of the oscillator voltage and the values of the resistor 61-capacitor 62 network. The diode 60 operates in exactly the same manner and conducts during the same portion of the input cycle, except that the D.-C. voltage delivered to the resistor 64-capaitor 65 is negative but equal to the positive voltage developed across the resistor 61-capacitor 62 network.

Since there are equal and opposite voltages at the remote ends of the resistors 61 and 64, and these resistors are of equal value, there is no current flow from, or to the junction of these resistors so there is none at the hypothetically grounded center tap of the winding 58. If a D.-C. voltage is applied between the center cap of the winding 58 and ground, the capacitor 63 will be charged to that level each time one of the diodes conducts, and since there is no discharge path (except through the diodes) this potential will be maintained across the capacitor 63.

The circuit operates in the same manner when the subcarrier sidebands are applied between the center tap of the winding 58 and ground. With reference to FIGURE 4*a*, the wave form E represents a double sideband suppressed carrier signal which is applied to the center tap of the winding 58. If the oscillator switching voltage, which is large relative to that of the sideband signals, is phased so that the diodes conduct at the times indicated by the dots, the output voltage across the capacitor 63 will be that shown in FIGURE 4*b*, which is a step approximation of the original modulating wave. It should be noted that the negative portions of the modulating voltage cause the subcarrier sidebands to reverse in phase by 180° with respect to the positive portions of the modulating wave. The resultant step approximation wave form has very little harmonic distortion and the amplitude of the spurious (higher frequency) output components is much less than that of the desired signal; becoming zero when the subcarrier sideband voltage goes to zero. In other words, the detector is balanced with respect to the 38 kc. oscillator switching voltage, so that none of this voltage is applied to the phase splitter 74, and the conduction angle of the diodes 59 and 60 is small enough substantially to prevent the unbalanced subcarrier sidebands and other high frequency components from being applied to the phase splitter.

Although the circuit for removing the pilot signal from the subcarrier sidebands has been described in connection with a predetection deemphasis circuit, it will be understood that past-detection deemphasis may be used without departing from the scope of the invention. In addition other forms of subcarrier regeneration circuits may be used if desired.

What is claimed is:

1. For a stereophonic frequency modulation receiver of the type including a frequency modulation demodulator for demodulating a received stereophonic carrier wave frequency modulated by a composite signal including main channel studio frequency components, a pilot signal component and subcarrier sideband components, a circuit for separating the pilot signal component from the composite signal component comprising, resonant circuit means tuned to the frequency of the pilot signal component for developing thereacross substantially only signals of the pilot signal frequency, a first impedance element for developing thereacross the composite stereophonic signal including said pilot signal component, means coupling said resonant circuit means and said first impedance element to said demodulator to receive said composite stereophonic signal, a bridge circuit including said resonant circuit means and said first impedance element effectively connected in series for alternating currents, a third and fourth serially connected impedance elements connected across the series circuit including said resonant circuit means and said first impedance elements, and an output circuit for deriving said composite signal substantially without said pilot signal component across the diagonal of said bridge extending from the junction of said resonant circuit means and first impedance elements to the junction of said first and second impedance elements.

2. A circuit as described in claim 1 wherein the ratio of the impedance of said second impedance element to the impedance of said third impedance element is substantially equal to the ratio of the pilot signal component voltage appearing across said resonant circuit means to the pilot signal component voltage appearing across said first impedance element.

3. For a stereophonic frequency modulation receiver of the type including a frequency modulation demodulator for demodulating a received stereophonic carrier wave frequency modulated by a composite signal including main channel audio frequency components, a pilot signal component and subcarrier sideband components, a circuit for separating the pilot signal component from the composite signal component comprising, resonant circuit means tuned to the frequency of the pilot signal component for developing thereacross substantially only signals of the pilot signal frequency, a first impedance element for developing thereacross the composite stereophonic signal including said pilot signal component, means coupling said resonant circuit means and said first impedance element to said demodulator to receive said composite stereophonic signal, a bridge circuit including said resonant circuit means and said first impedance element effectively connected in series for alternating currents, a third and fourth serially connected impedance elements connected across the series circuit including said resonant circuit means and said first impedance elements, the relative values of said second and third impedance elements being such that said composite signal substantially without said pilot signal component is developed across the diagonal of said bridge from the junction of said resonant circuit means and first impedance elements to the junction of said first and second impedance elements, a filter circuit for selecting said subcarrier sideband components coupled across said diagonal, a carrier regeneration circuit for developing a demodulating signal synchronized by said pilot signal component, and a subcarrier detector circuit coupled to said filter circuit and said carrier regeneration circuit for demodulating said subcarrier sidebands.

4. A circuit as defined in claim 3 wherein said filter circuit has a frequency response peaked at the subcarrier frequency to provide predetection deemphasis of said subcarrier sideband components.

5. For a stereophonic frequency modulation receiver including means to provide a composite signal including main channel audio frequency components, a pilot signal component, and subcarrier sideband components, an amplifier circuit for separating a pilot signal component from the composite signal component including an amplifying device having an input electrode an output electrode and a common electrode, an input circuit for said composite signal coupled to said input electrode, a resonant circuit tuned to said pilot signal component coupled between one of said output and common electrodes and a point of reference potential, a first impedance element connected between the other of said output and common electrodes and said point of reference potential, and second and third impedance elements connected between said output and common electrodes, the impedance values of said impedance elements being so related that the pilot signal voltage at the junction thereof is substantially balanced out.

6. For a stereophonic frequency modulation receiver including means to provide a composite signal including main channel audio frequency components, a pilot signal component, and subcarrier sideband components, an amplifier circuit for separating a pilot signal component from the composite signal component including an amplifying device having an input electrode an output electrode and a common electrode, an input circuit for said composite signal coupled to said input electrode, a resonant circuit tuned to said pilot signal component coupled between said output electrode and a point of reference potential, a first impedance element connected between said common electrode and said point of reference potential, and second and third impedance elements connected respectively between said output and common electrodes, the ratio of impedance values of said second and third impedance elements being substantially the same as the ratio of the pilot signal voltages across said resonant circuit and said first impedance element.

7. For a stereophonic frequency modulation receiver including means to provide a composite signal including main channel audio frequency components, a pilot signal component, and subcarrier sideband components, an amplifier circuit for separating a pilot signal component from the composite signal component including an amplifying device having an input electrode an output electrode and a common electrode, an input circuit for said composite signal coupled to said input electrode, a resonant circuit tuned to said pilot signal component coupled between said output electrode and a point of reference potential, a first resistor connected between said common electrodes and said point of reference potential, second and third resistors connected between said output and common electrodes, the resistance values of said second and third resistors being so related that the pilot signal voltage at the junction thereof is substantially balanced out, and a subcarrier detector coupled to said resonant circuit and to the junction of said second and third resistor.

8. For a stereophonic frequency modulation receiver of the type including means to provide a composite signal including main channel audio frequency components, a pilot signal component, and subcarrier sideband components, a subcarrier detector circuit responsive to a switching signal locked in phase with said pilot component and to said subcarrier sidebands to derive audio frequency information from said sidebands, an amplifier device having an input electrode, an output electrode and a common electrode, means for applying said composite signal to said input electrode, a resonant circuit tuned to the frequency of said pilot signal component and coupled between one of said output and common electrodes and a point of reference potential, first impedance element connected between the other of said output and common electrodes and said point of reference potential, a second and third impedance elements connected in series between said output and common electrodes, the impedance values of said second and third impedance elements being so related that the pilot signal component at the junction thereof is substantially balanced out, means coupled between said resonant circuit and said subcarrier detector circuit for providing a switching signal locked in phase to said pilot signal component, and filter means coupled from the junction of said impedance elements to said subcarrier detector for applying said subcarrier sideband components to said detector.

9. A subcarrier detector circuit of the type defined in claim 8 wherein a ratio of said second impedance element to said third impedance element is equal to the ratio between the pilot signal composite voltages developed across said resonant circuit and said first impedance means.

No references cited.

UNITED STATES PATENT OFFICE

CERTIFICATE OF CORRECTION

Patent No. 3,124,653 Dated March 10, 1964

Inventor(s) John O. Schroeder

It is certified that error appears in the above-identified patent and that said Letters Patent are hereby corrected as shown below:

Column 10, line 19, that portion reading "third and fourth" should read --second and third--; lines 27-28, that portion reading "first and second" should read --second and third--; line 56, that portion reading "third and fourth" should read --second and third--; lines 65-66, that portion reading "first and second" should read --second and third--. Column 12, line 45, after "said", insert --second and third--; line 54, that portion reading "means" should read --element--.

Signed and sealed this 24th day of August 1971.

(SEAL)
Attest:

EDWARD M.FLETCHER,JR.
Attesting Officer

WILLIAM E. SCHUYLER, JR.
Commissioner of Patents